Fig. 2

INVENTOR.
OLIVER K. KELLEY
BY
T. L. Chisholm
ATTORNEY

March 1, 1966 O. K. KELLEY 3,237,481
TRANSMISSION

Original Filed Sept. 29, 1955 6 Sheets-Sheet 3

Fig. 2a

INVENTOR.
OLIVER K. KELLEY
BY
T. L. Chisholm
ATTORNEY

INVENTOR
OLIVER K. KELLEY
BY F. L. Chisholm
ATTORNEY

United States Patent Office 3,237,481
Patented Mar. 1, 1966

3,237,481
TRANSMISSION
Oliver K. Kelley, Bloomfield Hills, Mich., assignor to General Motors Corporation, Detroit, Mich., a corporation of Delaware
Continuation of application Ser. No. 631,115, Dec. 28, 1956, which is a division of Ser. No. 537,472, filed Sept. 29, 1955. This application Aug. 13, 1959, Ser. No. 833,447
24 Claims. (Cl. 74—677)

This application is a continuation of my application Serial No. 631,115, now abandoned, and is a division of my application Serial No. 537,472 filed September 29, 1955.

This invention relates to improvements in arrangements of hydrodynamic torque transfer and/or multiplying devices and associated gearing for driving a power output member at various speed ratios from a power input member. These are particularly, although not exclusively, suited to motor vehicle transmissions, and such a transmission is described herein as one example of a device to which my invention may be applied. Also, the invention is especially adapted to hydrodynamic torque converters or speed reducers which multiply torque, but some features of the invention are applicable to transmissions generally.

In hydrodynamic torque converters a turbine can readily be constructed to provide any practical degree of torque multiplication on starting, but if the degree of starting torque multiplication is sufficiently high, the torque supplied by the turbine decreases rapidly as the tubine starts to turn, and vanishes at an impractically low turbine speed. This provides poor acceleration and may furnish little or no torque as the device approaches coupling or one-to-one speed ratio. On the other hand, a turbine can be constructed to provide acceptable coupling characteristics if or when the load reaches approximate impeller speed, but this is done at a sacrifice of starting or stall torque and accelerating torque in the middle ranges of speed.

The foregoing considerations have led to the design and construction of hydrodynamic torque transfer devices, especially torque converters having various arrangements of multiple turbines of varying torque characteristics with or without torque multiplying gearing. Many of those proposed or constructed operate satisfactorily within inherent limitations which it has heretofore been impractical to avoid, and their disadvantages include inadequate maintaining of torque multiplication during intermediate speed ranges, and the impossibility of obtaining adequate torque multiplication in these ranges. These have produced cars which have been sluggish in performance after starting and cars in which it has been impractical to obtain a so-called passing gear, by which is meant the ability to provide a spurt of high acceleration when running at moderate or high speed. Such known devices frequently have been of low efficiency requiring high operating costs.

My invention seeks to overcome these and other disadvantages of known hydrodynamic transmissions and to provide a transmission which changes torque ratio smoothly and continuously, that is by infinitely small increments without shifting of mechanical torque multiplying devices such as gears. It seeks to improve the efficiency of torque converters and to provide a hydrodynamic torque converter which has a high starting torque ratio, and maintains a higher torque ratio than was formerly had during acceleration to one-to-one drive.

Any converter turbine has the inherent characteristic of providing diminishing torque multiplication (by which is meant absorbing diminishing torque) as the turbine speed increases toward impeller speed, as long as the turbine is operating alone, by which I mean that there is no other turbine ahead of the turbine in question in the liquid stream from the impeller, which other turbine is delivering torque. I combine a series of such turbines, including torque-absorbing means having different torque absorbing characteristics, in such a way that as the torque multiplication or torque absorbed by one turbine decreases the torque multiplications or torque absorbed by downstream turbines increase. By providing a sufficient number of such turbines, while the turbines of the series are successively fading out, that is their torque multiplications are decreasing toward zero, the downstream turbines are increasing their torque ratios so that the torque ratio of the torque converter as a whole decreases toward coupling much more slowly than heretofore, and stays at practically high values over long periods of acceleration of the vehicle. This provides a maneuverable vehicle of high performance, which is very desirable in present day driving conditions.

Preferably, I combine a series of axial flow turbines with a radial inflow turbine and connect each turbine to an output shaft by a mechanical connection having a lower mechanical advantage than that of the connections of the preceding turbine of the series. Preferably also, the connection of the final or radial inflow turbine is direct and the connections of all the other turbines are free-wheeling. In this way during acceleration of the car each turbine runs faster than the next turbine downstream, and as each turbine, except the last, approaches its terminal speed and its torque consequently vanishes, that turbine is disconnected from the output shaft, and is free to float or turn idly in the oil stream, neither putting out torque nor taking up any significant amount. For all practical purposes, except for factors such as friction losses each free-wheeling turbine may be considered as removed from the transmission.

I also provide means for increasing the torque ratio of one or more of the turbines at any car speed to provide sudden spurts of higher torque ratio for acceleration in emergencies or for a passing gear. This may be done, for example, by increasing the inherent torque ratio of one or more of the turbines, or by increasing the angle of the reaction blades, or both.

The invention also includes improved arrangements of gearing especially helpful in achieving the foregoing objects.

The foregoing and other objects and advantages of the invention will be apparent from the annexed description and from the accompanying drawings, in which:

GENERAL DIAGRAMMATIC ARRANGEMENT

Figure 1:
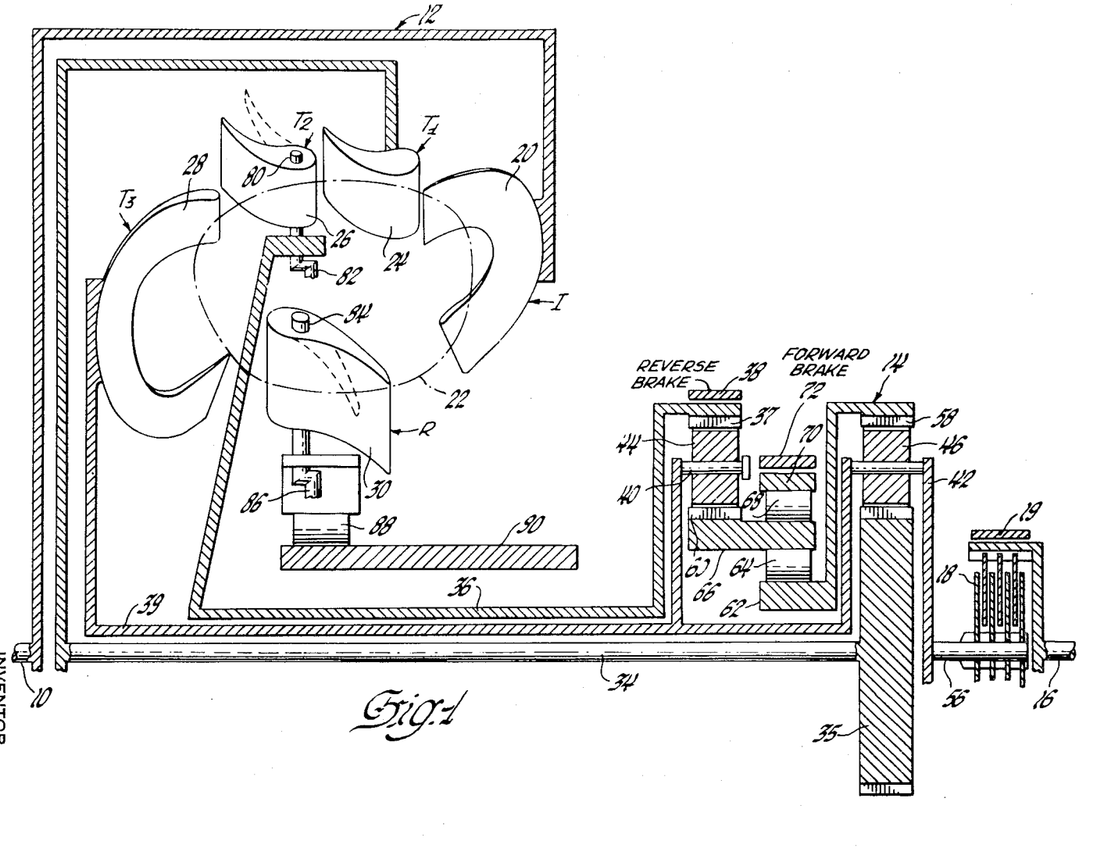
FIG. 1 is a schematic longitudinal section of a transmission embodying one form of my invention, FIGS. 2 and 2A collectively form one-half of a symmetrical longitudinal section of the actual structure of a transmission embodying one form of my invention, FIG. 2 being a section of the torque converter and FIG. 2A being a section of the gearing driven by the torque converter and a neutral torque-establishing device.

Referring to FIG. 1, the transmission includes in general an input shaft 10 driving a hydrodynamic torque converter 12 which in turn drives planetary reduction gearing 14 which can be connected to a final drive shaft 16 by a neutral clutch 18. The final drive shaft may have a brake 19. The construction and arrangement of the torque converter as well as the construction and arrangement of the reduction gearing separately and in combination are believed to include novel features.

The torque converter includes a pump or impeller I of generally known form, represented diagrammatically in FIG. 1 by a single blade 20, rotated by the input shaft 10 and circulating working liquid in a closed toroidal path, the center line of which is represented by the dotted line 22 in FIG. 1.

In my invention I include a first turbine $T_1$ as represented in FIG. 1 having torque-absorbing means in the form of blades 24, a second turbine $T_2$, represented by torque-absorbing means or blade 26, a third turbine $T_3$, represented by torque absorbing blade 28 and a reaction member R, represented by blade 30. The liquid from the pump I flows successively through $T_1$, $T_2$, $T_3$ and R.

The first turbine $T_1$ is connected to shaft 34 to drive a rear input sun gear 35 of the planetary gearing. The second turbine $T_2$ is connected to shaft 36 to drive a front input ring gear 37, which can also be held fast by a reverse band 38. The third turbine $T_3$ is connected by shaft 39 to drive front and rear carriers 40 and 42, which respectively support front planetary pinions 44 meshing with the front input ring gear 37, and rear planetary pinions 46 which mesh with the rear input sun gear 35. The shaft 39 forms the principal drive shaft of the transmission and through the carrier 46 is connected to the transmission output shaft 56 which drives the final drive shaft 16 through clutch 18. A reaction ring gear 58, meshing with planet pinions 46 completes the rear planetary unit of the reduction gear, and a reaction sun gear 60, meshing with the front planet pinions 44, completes the front planetary unit.

The rear reaction ring gear 58 is connected to the hub or inner race 62 of an inner one-way torque-establishing device having one-way ratchet members, such as sprags or rollers 64, mounted inside of an intermediate hub 66, which forms the outer race for ratchet members 64, and also forms a hub or inner race for an outer one-way torque-establishing device having outside sprags or rollers 68 within an outer race 70 which can be held against rotation by a forward drive torque-establishing device 72. The intermediate race 66 is connected to the front reaction sun gear 60, and may be formed integral with it. The arrangement of the one-way torque-establishing devices is such that when the forward drive torque-establishing device 72 is set, the hub 66 and the reaction sun gear 60 are prevented from turning backward by the ratchet members 68, and the hub 66 and ratchet members 64 in turn prevent the race 62 and reaction ring gear 58 from turning backward. In one condition of operation the ring gear 58 turns forward while the reaction sun gear 60 is held stationary, and under another condition both the ring gear and sun gear turn forward. Under another condition of operation, e.g., reverse drive, the front sun gear 60 is positively driven backward by the rear ring gear 58, the forward torque-establishing device 72 being released, as will be explained.

OPERATION OF GENERAL ARRANGEMENT

The structure as so far described operates as follows:

Assume that the input shaft 10 is driven by the engine of an automobile whose propeller shaft is the final drive shaft 16, that the neutral clutch 18 is engaged, and that the car is at rest.

For forward drive the torque-establishing device 72 is set, the reverse torque-establishing device 38 being released. On starting, the inertia of the car holds the carriers 40, 42 and turbine $T_3$ stationary. Oil from the pump I (rotated at suitable speed) exerts torque on $T_1$ to drive the rear input sun gear 35 forward. Since the rear carrier 42 is momentarily held stationary, the rear pinions 46 attempt to drive the rear reaction ring gear 58 backward. This is prevented by torque-establishing device 72 and the two one-way torque establishing devices 70–68–66 and 66–64–62. Consequently, ring gear 58 acts as a reaction gear and the pinions 46, driven by sun gear 35, walk around inside the ring gear to rotate the carrier 42 and output shaft 56 forward at a slower rate than the rotation of the sun gear, thus multiplying the torque supplied by the turbine $T_1$. This motion also positively drives the turbine $T_3$ forward, regardless of the hydraulic conditions in the torque converted. It will be observed that $T_1$ while exerting its positive drive, necessarily runs faster than output shaft 56 by an amount represented by the ratio of the rear planetary gear set.

In addition, oil flowing from $T_1$ to $T_2$ exerts torque on $T_2$, which through shaft 36 drives the front ring gear 37 forward, tending to rotate the front pinions 44 forward and, when ring 46 rotates fast enough, tending to rotate the front sun reaction gear backward. This is prevented by the outer one-way torque-establishing device 70–68–66, and in fact, the front sun gear has previously been locked by the rear reaction ring gear 58 and the two one-way torque-establishing devices. Consequently, the front ring gear 37 adds the torque of $T_2$, multiplied by the ratio of the front planetary unit to the transmission output shaft 56 by walking the front pinions around the front reaction sun gear 60, driving carrier 40 forward at reduced speed equal to the ratio of the front planetary gear set.

On starting the car, and below some definite speed depending on the design of the blades of the torque converter, the third turbine $T_3$ does not exert any positive or forward torque derived from hydraulic action but, as previously stated, it is positively driven by the carriers. However, at some definite speed ratio of input shaft to output shaft, positive hydraulic torque is impressed on $T_3$ and its speed due to hydraulic action tends to exceed the speed of the carriers driven by the other turbines. At this point $T_3$ assists in driving the car by torque exerted on the main drive shaft 39–56.

As the speed of the car progressively increases from standstill two things happen successively. First, the torque absorbed by $T_1$ and delivered to the output shaft through the rear planetary unit drops to a vanishing point as $T_1$ reaches its terminal speed. When this becomes less than the speed of $T_2$ multiplied by the ratio of the front planetary unit, $T_2$ is driving the carriers faster than $T_1$ can drive them and the inner one-way torque-establishing device or free-wheeler 66–64–62 breaks away, the rear reaction ring gear 58 rotates forward and $T_1$ idles in the oil stream. $T_2$ is now driving the car, assisted by $T_3$. Second, upon further increase in the speed of the car $T_2$ reaches its terminal speed and can no longer drive the carriers through the front planetary as fast as $T_3$ which is directly connected to them. $T_3$ then drives the carriers faster than $T_2$ can drive them. At this point the outer free-wheeler 70–68–66 breaks away, the sun gear 60 turns forward and $T_2$ idles in the stream of the oil.

For reverse drive, forward torque-establishing device 72 is released and reverse brake 38 is set to hold front ring gear 37 to act as a reaction gear. Incidentally, this holds $T_2$ stationary during all reverse drive. $T_1$ drives rear input sun gear 35 forward, which because the carrier 42 is initially held by the stationary car, drives the rear ring gear 58 backward, and through the inner one-way torque-establishing device 66–64–62 tends to drive the front sun gear 60 backward. This is permitted in fact, for although the outer one-way torque-establishing device 70–68–66 tends to lock, its race 70 can turn backward, being unopposed by the torque-establishing device 72. Consequently, the front sun gear 60, rotating backward, walks the front pinions 44 backward around the ring 37, now acting as a reaction gear, and the carrier 40 is rotated slowly backward, driving the car backward and carrying the turbine T₃ positively backward. In fact, it is possible, depending on blade design, for the turbine T₃ to have reverse torque impressed on it hydraulically, in which case it will assist in driving the car backward. The turbine T₂, being held stationary in reverse drive, can act as a guide wheel or reaction member, directing oil from T₁ to the front sides of the T₃ blades, causing them to tend to drive the carriers backward. This will be explained in detail below.

Figure 3:
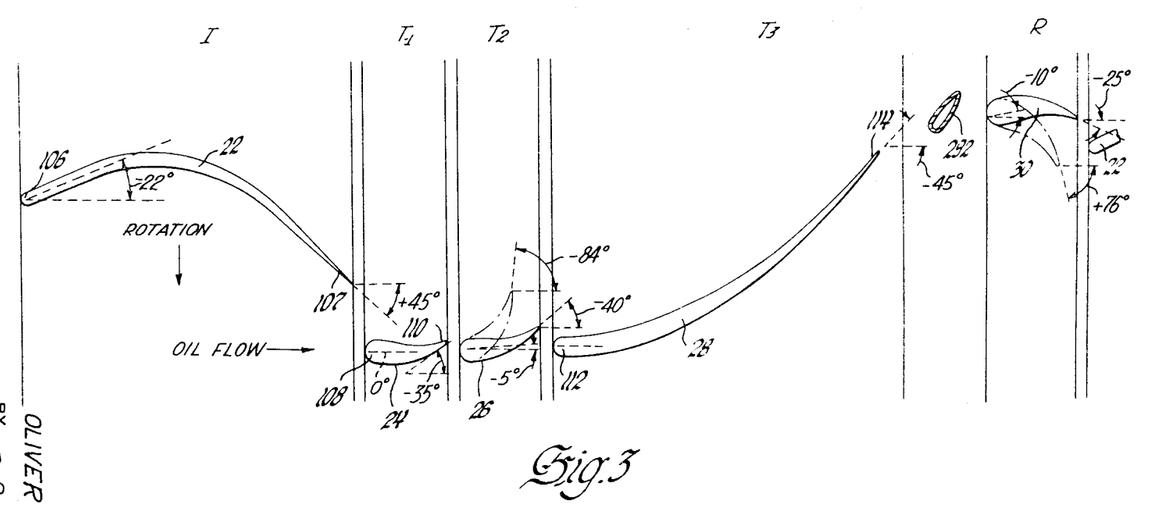
FIG. 3 is a diagrammatic developed view of the sections of the blades of the torque converter.

FIG. 3 shows diagrammatically the relationship of the blades to one another, this figure being a developed or unrolled diagram of the cross sections or traces of the blades on a cylindrical surface representing the flow of oil corresponding to the line 22 in FIG. 1. The blades are represented as moving from the top toward the bottom of the drawing, as shown by the rotation arrow in FIG. 3. Oil flows from left to right as shown by the oil flow arrow.

Figure 8:
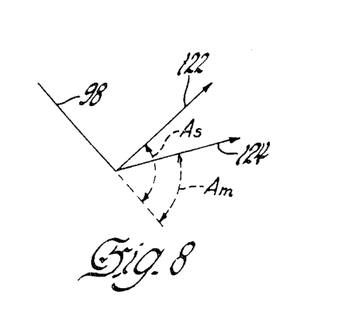

The angle of incidence of a blade is the angle formed between a plane determined by the axis of the transmission and a radial line passing through the nose, and a plane tangent at the nose of the camber surface of the blade. The camber surface is that curved surface determined by the axes of all circular cylinders which can be placed within the blade so that of the tangent plane at the nose by 94 and the trace of the axial and radial plane through the nose by 95. The angle of incidence is the angle 96. Angles are measured between those portions of the planes extending from the intersection of the planes in the axial direction of oil flow, and the angle is considered positive when measured from the radial and axial plane in the direction the oil tends to move the blade. In FIG. 8 the angle 96 is measured from the line 95 opposite to the direction 97 in which the blade would move under the influence of oil flowing in the direction 98 and is therefore negative. The angle of incidence is about $-8°$.

Similarly the discharge angle is the angle formed between the plane tangent to the camber surface at the tail and the plane determined by the axis of the transmission and the radial line through the tail. In FIG. 8, the line 99 is the line tangent to camber line or trace of the camber surface at the tail, and 100 is the trace of the radial and axial plane through the tail. The angle of discharge is 101, and because this, too, is measured from the line 100 opposite to the direction of movement of the blade, the angle of discharge is negative, being about 44° when the blade is in the position shown by the full lines. The line 102 is the position line of the blade, that is the trace of the position plane, which is the position taken by a plane surface physically placed against the concave side of the blade. The angle of the position line is a convenient quantity to measure physically to determine the general angularity of the blade as a whole. Herein where I use the term high angle and low angle referring to a blade as a whole, I mean that the position plane makes a large or small angle, respectively, with a radial and axial plane passing through the pivot of the blade. For example, in FIG. 8 the position angle of the blade in the full line position is 103 which is a relatively low angle. In the dash-dot line position, the blade has a relatively high position angle represented by 104.

In FIG. 3, each pump blade 22 may have a thin rounded nose 106 having an entrance angle of about $-22°$ and a generally air-foil cross section terminating in a thin tail 107 having a discharge angle of $+45°$. This provides what I call a forward bend pump, by which I mean that the discharge edge of the pump blade is bent or inclined forward from the axis in the direction of rotation. This forward bend or positive discharge angle materially increases the tangential velocity of the oil, providing a forward or tangential velocity which is greater than the speed of rotation of the pump. The blade 24 of the first turbine T₁ has a thick rounded nose 108 whose angle of incidence is zero, and a generally airfoil cross section ending in a thin tail 110 having a discharge angle of about $-35°$. The blade 26 of the second turbine T₂ is similar in shape to the blade 24. When it is in the full line position of FIG. 3 (which as will be explained is low performance position) the blade 26 may have an incident angle of about $-5°$ and a discharge angle of about $-40°$. When in dotted-line or high performance position the T₂ blade may have an incident angle of about $-39°$ and a discharge angle of about $-84°$. The blade 28 of the third turbine T₃ has a rounded nose 112 thicker than the nose 106 of the pump blade and thinner than the nose 108 of T₂ blade; with an incident angle of zero. It has generally parallel sides converging into a thin tail 114 having a discharge angle of about $-45°$. The reaction blade 30 is generally similar in shape to the turbine blades 24 and 26 but is thicker and is reversed in direction, having when in full line position an incident angle of about $-10°$, and a discharge angle of about $+25°$. When in dotted line position or high performance position, the reaction blade has an incident angle of about $+41°$ and a discharge angle of about $+76°$.

The torque which a turbine absorbs from the oil stream and delivers to the output shaft is influenced by the velocity of oil striking the blades and by the angle in space through which the turbine blade deflects the oil. The angle in turn is influenced not only by the difference between the absolute direction in space of the incident oil and the exit angle of the blade itself, but also by the speed of the blade relative to the oil. The entrance angle of incidence of the blade itself does not importantly affect the angle through which the oil is turned. Oil strikes the blade in a given direction which is wholly independent of the shape of the blade, and it leaves the blade in a direction determined by the shape of the blade and the speed of its movement. The entrance angle is chosen to reduce shock loss or spatter of the incident oil, and so the incident angle affects the efficiency of the turbine but not its torque-multiplying characteristic.

Figures 4, 5:
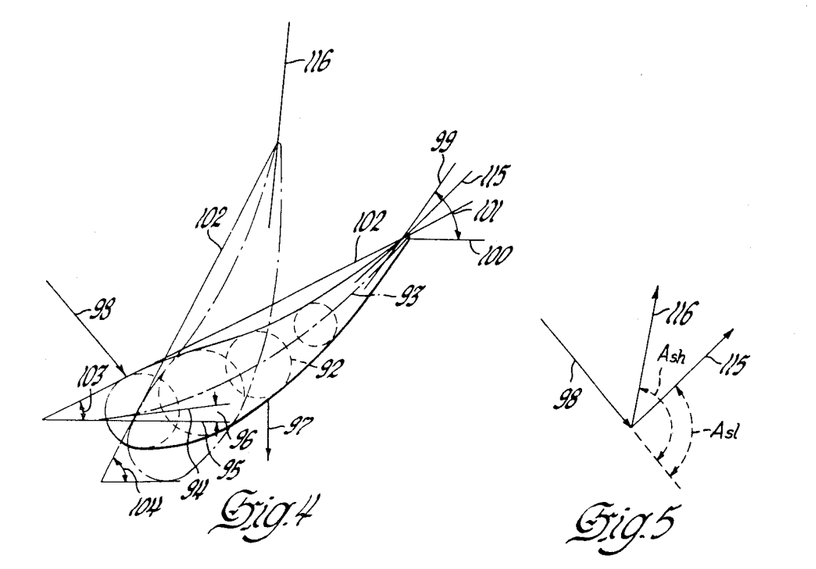
FIG. 4 is a diagrammatic section of one of the turbine blades to illustrate nomenclature.
FIG. 5 is a vector diagram of oil flow with respect to a stationary turbine blade both in low performance and high performance positions.

The relationships of inflowing and outflowing oil with reference to a turbine blade, and the effect of these relationships on torque multiplication are shown in FIGS. 4–8. Referring to FIG. 4, which shows two positions of the blade 26 of turbine T₂, assume that this blade is at rest in the full-line position and that oil strikes it at a velocity whose speed and direction are represented by the vector 98. Oil will leave the blade in a direction tangent to the inner surface of the blade at the tail, represented by the direction of the line 115 in FIG. 4, which is different from the tangent to the camber line 99. In FIG. 5, the vector 98 and the discharge direction 115 have been repeated parallel to their respective positions in FIG. 3 to show the angle $a_{s1}$ through which the oil has been turned in space. When the blade is in the dotted line position of FIG. 4, oil will also leave the blade tangent to the inner surface at the tail, and this direction is indicated by the line 116, which is also plotted in its true direction in FIG. 5 to show the angle $a_{sh}$ through which the oil is turned. It will be observed that $a_{sh}$ is greater than $a_{s1}$. The blade absorbs greater torque or has greater torque impressed on it by incident oil at velocity 98 when it is in the dotted-line position. Therefore, I refer to the full line position as low angle, meaning that when the blade is in this position the oil is turned through a relatively low angle. This is the low performance or low torque position. I refer to the dotted-line position as high angle, high torque or high performance position.

Figure 6:
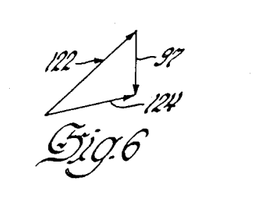
FIGS. 6, 7, and 8 are vector diagrams showing the flow relationships around a moving turbine blade.
Figure 7:
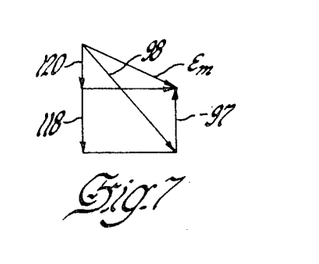

When the blade is moving less torque is absorbed by the blade than when it is at rest. The reason for this is illustrated in FIGS. 6–8. Assume the blade is moving in the direction and at a speed represented by vector 97 in FIG. 4, and that the incident oil moves with an absolute velocity 98 as in FIG. 4. The velocity of the oil relative to the blade will be the vectorial difference of 98 and 97 or the vector $e_m$ in FIG. 7. This impresses less torque on the blade for two reasons. First, the tangential component of the velocity of the oil relative to the turbine is less when the turbine moves. The tangential component is the speed of the oil in a direction tangent to the circle of motion of the blade. With the blade at rest this component is the long vector 118 in FIG. 7, but with the blade in motion this component is the shorter vector 120. Second, the angle in space through which the oil is turned by the blade is less. In FIG. 6 the direction of oil leaving the blade and relative to the blade may be represented by the vector 122 which is parallel to the line 115 in FIG. 4. The blade moves at speed represented by vector 97. The absolute velocity of the discharged oil is therefore the vectorial sum of 122 and 97 or the vector 124. In FIG. 8 the directions of the vectors 98, 122 and 124 are plotted to show that the angle $a_m$ through which it is deflected by the stationary blade.

Of course, if the absolute velocity of the entering oil changes, this changes the torque impressed on or absorbed by the turbine. The absolute velocity of oil leaving the pump, for example depends both on the speed of the pump and the tangential speed of oil entering the intake of the pump, which is influenced by the discharge angle of the stator blades. A given pump rotating at a constant speed can increase by a given amount the absolute speed of the oil, by which I mean speed regardless of direction. If the oil discharged by the stator into the pump has a high tangential speed in the direction of rotation of the pump, the oil discharged from the pump will have a correspondingly higher tangential speed and will impress more torque on the turbine than when the oil discharged by the stator has a low tangential speed.

Figure 9:
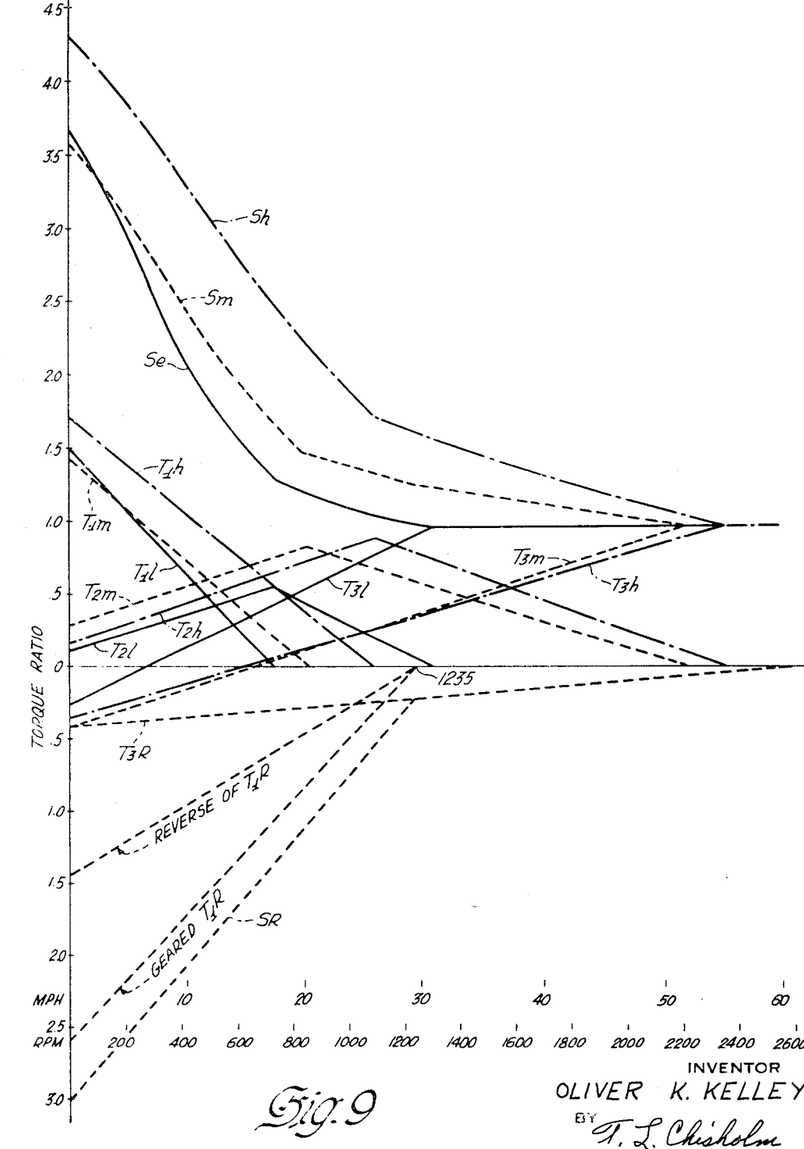
FIG. 9 is a diagrammatic representation of the torque characteristics of a torque converter embodying my invention.

FIG. 9 shows representative torque multiplication or torque-absorbing characteristics of the individual turbine blades in the assembled torque converter and the resultant characteristics of the torque converter as a whole. Torque multiplication or torque ratio is plotted as ordinates against output shaft speed in r.p.m. (and car speed in miles per hour) as abscissas for a given constant value of torque output by the engine. In this figure the designations $T_1$, $T_2$, and $T_3$ represent first turbine, second turbine and third turbine, respectively, and the letters S designate the resultant torque ratio of the torque converter as a whole. The letters L, M, H and R following the other letters indicate that the torque converter is in low performance condition, medium performance condition, high performance condition, and reverse, respectively.

*Low performance range*

In the lower left hand corner of FIG. 9 the sloping solid line $T_1L$ shows, by way of example, typical torque ratios or torque absorption curve of the first turbine $T_1$ when the torque converter is in low performance condition, that is when both the second turbine $T_2$ and the reaction member R have their blades at low angle. At stall, that is when the car is at rest and the impeller is rotating at significant speed, the turbine $T_1$ absorbs and exerts on the sun gear 35 approximately 1.5 times engine torque at a given intermediate degree of throttle opening. Assuming the throttle is not changed, as the car begins to move and its speed increases the torque absorbed by the turbine $T_1$ from the oil gradually decreases, as is well known, and this torque value ultimately disappears because the turbine blade is placed at a relatively low angle, and as the car speed increases the point is soon reached at which there is substantially no change in direction of the oil by the $T_1$ blades, and consequently no torque is absorbed by them. This is known as the terminal speed. In the example illustrated the torque of $T_1$ may disappear at about 730 r.p.m. output shaft speed representing about 17 miles per hour in a typical car in which $$\frac{N}{V}=42.5$$

where $N$=revolutions per minute of the propeller shaft and $V$=miles per hour of the car.

The solid line $T_2L$ shows the torque ratios or torque-absorption curve of the second turbine $T_2$ on the assembled torque converter under the conditions related above in connection with $T_1$. At stall the torque impressed on or absorbed by $T_2$ is relatively low, being about 0.1 times engine torque. This is because the $T_1$ blades and $T_2$ blades are very nearly at the same angle and the $T_2$ blades change direction of the oil only slightly. As the car speed increases the hydraulic torque impressed on $T_2$ increases because $T_1$ rotates at a higher speed than $T_2$, as determined by the planetary gearing, and therefore as the rotational speed of $T_2$ increases oil is delivered from $T_1$ to $T_2$ with a greater tangential component relative to $T_2$, as will be apparent from FIGURES 10 and 11. Thus the hydraulic torque absorbed by $T_2$ builds up a maximum value which may be about 0.55 times engine torque, and it will be noted that the torque of $T_2$ is increasing while the torque of $T_1$ is decreasing. When $T_1$ reaches the point where it exerts no torque, the free wheel unit 62–64–66 breaks away, letting the ring gear 58 turn forward and letting $T_1$ float idly in the oil stream, for all practical purposes, out of operation. $T_2$ at this point receives oil at the velocity with which the oil leaves the impeller, and as the car speed increases the torque impressed upon $T_2$ gradually decreases, as is well known. Ultimately the speed of $T_2$ reaches a point where it does not change the direction of oil and the turbine absorbs and exerts no torque. At this point of terminal speed the free wheel unit 66–68–70 breaks away and the turbine $T_2$ floats idly in the stream of oil. This point is indicated on the curve at 1300 r.p.m., slightly more than 30 m.p.h.

The solid line $T_3L$ shows the torque ratios or torque-absorption curve of the third turbine $T_3$ under the foregoing conditons. At stall negative torque is impressed on $T_3$ because the blades of $T_2$ (held stationary by the wheels of the car) direct oil to the back sides of the blades 28 as will be apparent from FIG. 3. This negative value at stall may be 0.125 of engine torque, but as the car begins to move and the speed increases, the angle of the oil discharged by $T_2$ into $T_3$ has an increasingly greater tangential component in the direction of rotation and the negative torque impressed on $T_3$ gradually decreases and soon becomes positive. The torque of $T_3$ increases, in fact, to the point where $T_2$ breaks away and free wheels, at which time the torque of $T_3$ is approximately equal to engine torque and the coupling condition occurs. As stated above this may be at 1300 r.p.m., slightly above 30 m.p.h. Thereafter $T_3$ alone drives the car at one-to-one torque ratio (neglecting losses) and $T_1$ and $T_2$ idle.

The curve $S_L$ represents the total torque delivered by the torque converter. Each point on this curve is the algebraic sum of the torque multiplication effected by the turbines $T_1$, $T_2$, and $T_3$ each multiplied by the ratio of the gearing through which each of these turbines drives the output shaft 16.

The rear planetary gear set 35–46–58 shown in FIG. 1 may have a gear ratio of approximately 2.55 so that when the ring gear 58 is held the sun gear 35, and of course the first turbine $T_1$ rotates 2.55 times as fast as the carrier 42 and the output shaft 16. The front planetary gear set 60–44–37 may have a ratio of about 1.6 so that when the sun gear 60 is held, the ring gear 37, and of course the second turbine $T_2$, rotate at 1.6 times the speed of the carrier 40 and the output shaft 16. The third turbine $T_3$ and the output shaft always rotate together. Thus at any speed the ordinate of the curve $T_1L$ multiplied by 2.55, plus the ordinate of the curve $T_2L$ multiplied by 1.6, plus the ordinate of the curve $T_3$ (taking into account its algebraic sign) is equal to the ordinate of the curve $S_L$. Therefore, at stall, although the turbine $T_3$ impresses negative torque on the output shaft, the entire torque converter has a high positive torque ratio because the negative torque is more than overcome by the high torque of the first turbine multiplied by its gear ratio. At stall the torque ratio of the torque converter over all is about 3.7 to 1. The torque ratio of the torque converter as a whole decreases as the car speed increases until at about 30 m.p.h. the torque ratio is substantially unity and coupling occurs. It will be observed that after about 30 m.p.h. the curves $S_L$ and $T_3L$ coincide, meaning that the first and second turbines are freewheeling and the third turbine alone is driving the car.

*Medium performance range*

While the torque converter operating as described provides a very satisfactory torque ratio at starting and low speeds it is sometimes desirable to increase the torque ratio throughout an intermediate speed range in order to provide satisfactory ability of the car to accelerate in conditions of heavy traffic. In order to increase the torque ratio of the transmission in the intermediate speed ranges, which may be considered to be between 15 and 40 m.p.h., the blades 26 of second turbine $T_2$ are placed at high angle, for example the dotted line position of FIG 7. This is the medium performance condition of the torque converter as a whole and is caused by the high torque, or high performance position of the second turbine alone, in which the oil is turned through a higher angle than before by the $T_2$ blades. In this position, as explained in connection with FIGS. 8–12, the torque ratio of $T_2$ is increased to the values shown by the broken line $T_2M$ in FIG. 14. This shows, for example, that in the high angle position the second turbine $T_2$ has about 2.5 times as much torque at stall as it does in the low angle position. The torque increases with increasing car speed until a value of about 0.8 is reached, as compared with 0.55 in the low angle position. Likewise the torque supplied by the second turbine continues throughout a longer range of car speed until a much higher car speed is reached, lasting until about 50 m.p.h. in the high angle position, as compared with about 30 m.p.h. in the low angle position. These torque values are multiplied by 1.6 and add to the torque supplied by the other turbines to the output shaft 16.

The first turbine $T_1$ has its torque characteristics changed slightly, but not importantly, by the movement of the second turbine $T_2$ to high angle position. In FIG. 15 the broken line $T_1M$ shows the torque ratio curve of the first turbine under these conditions.

The torque delivered by the third turbine in the medium performance condition is reduced as compared to the low performance condition. At stall there is a higher negative torque on the third turbine $T_3$ and it requires longer for the third turbine to reach coupling. This condition is represented by the broken line $T_3M$. It will be observed that this torque begins at about —.35, as compared with about —.25 at stall in the low performance range and that coupling is reached at about 50 m.p.m., as compared with about 30 m.p.h. The increased negative torque on $T_3$ is due to the fact that $T_2$ at high angle directs oil to the backside of the blades of $T_3$ in a direction having a higher tangential component than in low performance range, and due to the high angle of the $T_2$ blades it requires a higher car speed before the oil flowing from $T_2$ strikes $T_3$ in the forward direction. As seen from FIG. 15 this occurs at about 15 m.p.h., as compared with about 7 m.p.h. in the low performance range. However, due to the 1.6 gear ratio of the second turbine the torque ratio curve of the transmission, as a whole, is raised and is represented by the broken line $S_M$. The torque under these conditions at stall may be slightly lower than the stall torque under low performance condition but the difference is not significant. This higher torque of the transmission as a whole continues to about 51 m.p.h. when coupling is reached, as compared with about 30 m.p.h. in the low performance range. At speeds above 51 m.p.h. the curves $S_M$ and $T_3M$ coincide on the coupling line.

*High performance range*

It is desirable to provide still higher torque multiplication over a still longer range of car speed for some conditions of drive, for example for hill climbing and passing other cars at relatively high speed. In order to provide this third or higher performance range the $T_2$ blades are continued in the high angle position of the medium performance range, and the stator blades are placed at high angle. The placing of the stator blades at high angle increases the torque of $T_1$ so that at stall $T_1$ provides about 1.7 times engine torque, and the torque of $T_1$ does not fade out until about 26 m.p.h. This is shown by the dash-dot line $T_1H$. Theoretically the torque provided by $T_2$ should also be increased by placing the stator blades in high angle, up to the point where the high angle restricts the flow of oil. This occurs here, and the torque of $T_2$ is reduced slightly at stall as shown by the dash-dot line $T_2H$. However, the torque of $T_2$ in the high performance range increases slightly above its maximum in the medium performance range and lasts to a higher car speed. The torque of $T_3$ is raised slightly at stall and it requires slightly longer for $T_3$ to reach coupling but this change is not significant in amount, and for all practical purposes the torque value of $T_3$ may be considered to be the same both under medium performance and high performance conditions.

The algebraic sum of the ordinates of the curves $T_1H$, $T_2H$, and $T_3H$ each multiplied by the appropriate gear ratio gives a resultant torque multiplication curve curve $S_H$. It will be observed that this provides a torque ratio of approximately 4.3 at stall, that the torque ratio remains above 1.5 up to a speed of about 25 m.p.h. and that it does not decrease to coupling until about 55 m.p.h. Consequently, at any car speed below about 50 m.p.h. the ability of the car to accelerate can be increased by changing the second turbine from low angle to high angle and this acceleration ability can be still further increased by changing the stator from low angle to high angle.

*Reverse*

In reverse the second turbine $T_2$ is held stationary as explained above, and preferably the control system is arranged so that the $T_2$ baldes are always in high angle. $T_1$ provides torque comparable to the line $T_1M$ in FIG. 9 but this is reversed by the reversing gear and is represented by the line in FIG. 9 marked "Reverse of $T_1R$." Also in reverse $T_1$ runs slower with respect to the output shaft than it does in forward, because the reverse gear has a ratio of about 1.8 to 1 as compared to the forward ratio of about 2.55 to 1. In these conditions this torque curve has a different slope, and does not become zero until about 1235 r.p.m. output shaft speed. The torque curve of $T_1$ in reverse, as multiplied by the gear ratio is represented in FIG. 14 by the line marked "geared $T_1R$." To this is added the torque on $T_3$, which FIG. 9 shows to be about .45 at stall, so that the total torque multiplication of the transmission in reverse is about 3.0 at a particular throttle opening. Throughout the entire operation in reverse $T_2$ is stationary and acts as a guide or reaction member, directing oil to the back sides of the blades 28 of $T_3$, at an angle of incidence which at stall is about —84°, as illustrated in FIG. 3. This maintains a reverse torque on $T_3$ as long as the transmission operates in reverse. Because $T_2$ does not move, the hydraulic torque on $T_3$ will not drop off as rapidly as it does when the transmission is in forward drive. The torque will drop off solely due to the movement of $T_3$ as is known, and as is explained above in connection with FIGS. 4–8 and would not become zero until a theoretical speed of about 2600 r.p.m. is reached. This torque is represented by the line $T_3R$ in FIG. 9. The line SR represents the total torque multiplication of the transmission in reverse. At any point the ordinate of SR equals the sum of the ordinates of geared $T_1R$ and $T_3R$.

The axial flow turbines $T_1$ and $T_2$ each have terminal speeds considerably above the speed of the impeller. This is due to blade design and angle including the disposition of the turbine blades and the forward bend or positive discharge angle of the impeller, as shown in FIG. 7. For example, it is evident from FIG. 9 that when the propeller shaft has a speed of about 600 r.p.m., under a given set of conditions, the torque ratio of the torque converter as a whole is about 1.5, as shown by curve $s_1$. At this point the speed of the impeller may be about 1130 r.p.m., depending on the amount of slip in the torque converter, which in turn is influenced by blade design and overall efficiency of the converter. At this point $T_1$ is exerting torque on the car, and has not yet reached its terminal speed. At 600 r.p.m., output shaft speed, $T_1$ which is connected to the output shaft through a gear having a ratio of 2.55 is rotating at 2.55×600 r.p.m. or about 1530 r.p.m.

*Structural arrangement*

Figure 2:
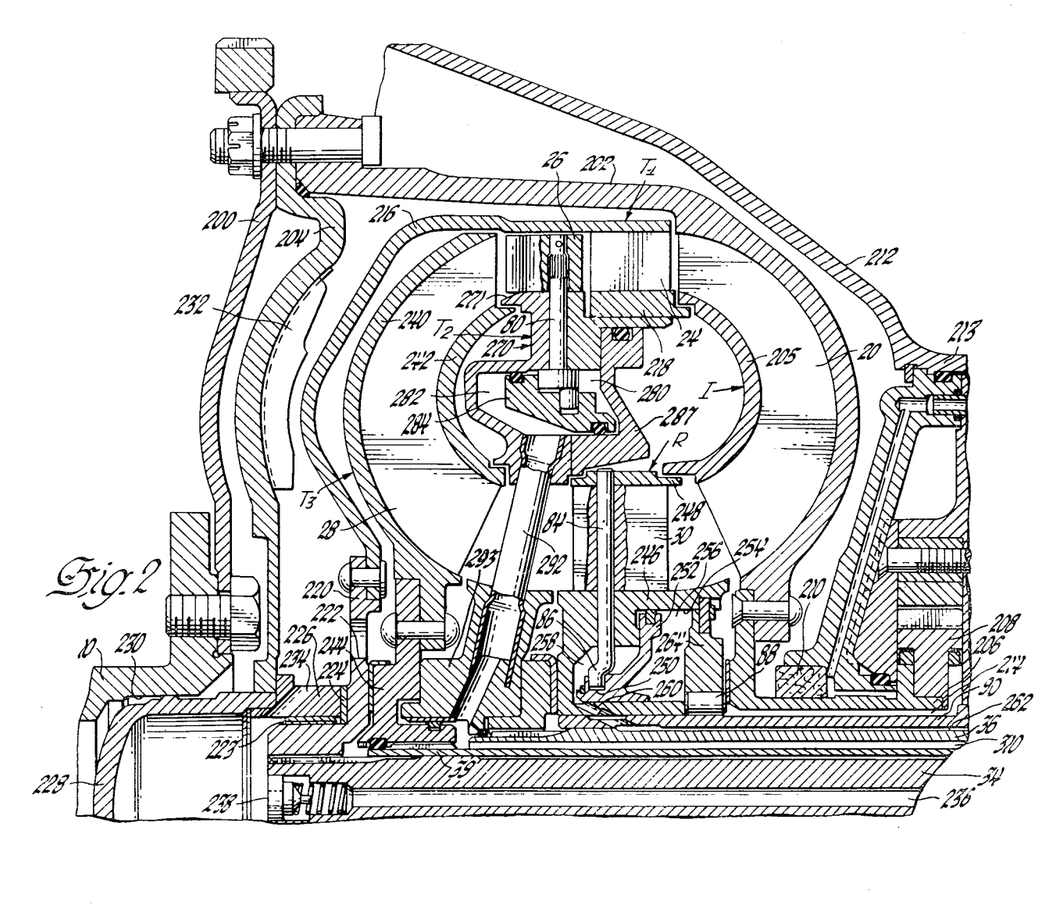
Figure 2A:
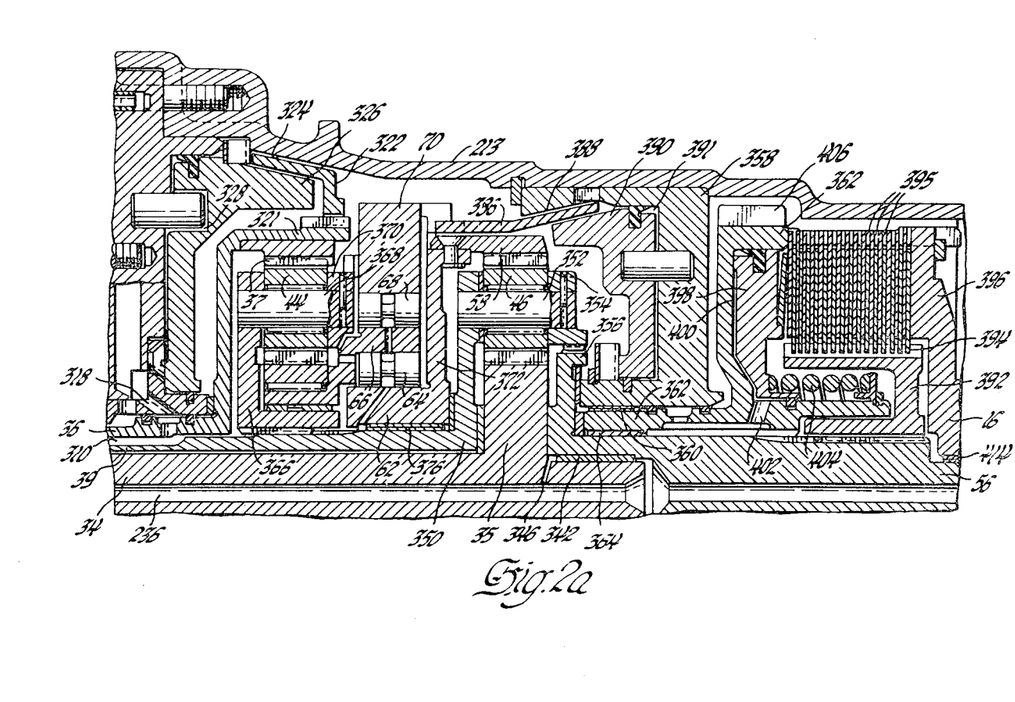

FIGS. 2 and 2A illustrate one form of actual structure embodying the invention and including the elements and their method of operation disclosed schematically above.

The structures of the impeller itself and of the first turbine, third turbine and reaction members themselves have been proposed by me and transmissions embodying these structures have been built and operated satisfactorily. This invention includes the second turbine $T_2$ arranged as shown diagrammatically in FIG. 1 and constructed as shown in FIG. 2 and includes the structural relationships of all the parts of the torque converter to each other and to the rest of the transmission as is now described.

Referring first to FIG. 2, the engine shaft 10 is bolted to a flywheel 200 which is bolted to a torque converted casing including an impeller shell 202 and a front cover 204. The blades 20 are attached to the impeller shell 202 and to an inner shroud 205. The space between the shell and the shroud forms the path through the impeller for working liquid, as is known. At the center of its rear end, the impeller shell is riveted to a flanged tubular shaft 206 which drives any suitable oil pump 208 (herein called the front pump). The shaft 206 is surrounded by a seal 210 which prevents leakage of oil from the torque converter into the dry housing 212 which encloses the torque converter and forms part of the transmission casing 213. The shaft 206 is spaced from the stationary reaction sleeve 90 to form a passage 214 by which working oil may be supplied to the torque converter, as is known.

The first turbine $T_1$ includes an outer supporting shell 216 and an inner shroud 218 between which the blades 24 are fixed. The $T_1$ shell 216 is riveted at its center to flange 220 keyed to the innermost shaft 34 which drives the rear sun gear 35 shown in FIGS. 1 and 2A. The flange 220 is provided with a number of openings 222 for equalization of pressure between opposite sides of the $T_1$ shell 216. The flange supports the front end of the shaft 34 and is itself supported for rotation by a radial bearing 223 and a thrust bearing 224 both in a collar 226 which is secured to the front cover 204, which in turn is supported at its center by the cap 228 which is slidably supported in a bore 230 in the engine shaft 10. The cap 228 completes the closed chamber of the torque converter formed by the seal 210, impeller shell flange 206, impeller shell 202 and front cover 204. The front cover 204 carries on its inner face a number of radial vanes 232 which rotate the liquid in the space between the cover 204 and the first turbine shell 216 at the same speed that the liquid is rotating within the working space of the torque converter and thus creates outside of the first turbine shell 216 a static centrifugal pressure which balances that within the torque converter. The collar 226 has openings 234 permitting oil to return from the torque converter to the system through a passage 236 in the shaft 34 under the control of a spring-loaded pressure responsive relief valve 238 which controls the pressure in the torque converter.

The third turbine $T_3$ has an outer shell 240 and an inner shroud 242 between which the blades 28 are fixed. The $T_3$ outer shell is riveted to a flange 244 keyed to the tubular main shaft 39 which drives the carriers 40, 42 of both planetary gear units and the transmission output shaft 56. The reaction member, guide wheel or stator R which is placed between the outlet of the turbine $T_3$ and the inlet of impeller I includes the adjustable vanes 30 fixed to the pivots or spindles 84 mounted between a reaction support 246 and an inner shroud 248. Each spindle 84 has a crank arm 86 disposed in an annular groove 250 in an annular piston 252 which divides a cylinder 254 in the support 246 into two pressure chambers 256 and 258. The pressure chamber 256 communicates with the working space within the torque converter and with the oil supply passage 214 between shaft 206 and sleeve 90. The pressure chamber 258 may be supplied with oil under pressure from any suitable control system, not shown, through the passage 260 which communicates with the annular space 262 between the reaction sleeve 90 and the shaft 36 of the second turbine $T_2$. The position of the piston determines the position of the stator blades 30. The reaction support 246 is free-wheeled on the stationary reaction sleeve 90 by an overrunning torque-establishing device including the sprags or rollers 88 riding on the inner race formed by the sleeve 90 and within an outer race 264 keyed to the reaction support in such a way as to permit hydraulic communication between the converter supply passage 214 and the pressure space 256. The torque-establishing device 264–88–90 corresponds to the one-way torque-establishing device 88 in FIG. 1 and permits forward rotation of the entire reaction assembly and prevents reverse rotation.

The blades 26 of the second turbine $T_2$ are each fixed to a shaft 80, previously described, journaled in an annular support 270 shown in FIG. 2.

The path of oil through the second turbine $T_2$ is between the surface 271 on the support 270, which surface forms an inner shroud or boundary, and the shell 216 of the first turbine $T_1$ (see FIG. 2). The support 270 includes a pair of mating halves 272 and 274 which meet at the surface whose trace in the plane of the paper is the dot-dash line 276 in FIG. 4, in which surface are located all the centers of the shafts 82. The halves 272 and 274 are held together, after assembly of the shafts and blades and the piston described below, by fastenings 278. The support 270 includes an annular cylinder which is divided into two pressure chambers 280 and 282 by an annular piston 284 having an annular groove 286 in which lie crank arms 82, one on each shaft 80. The position of the piston, effected by pressures in the chambers 280 and 282, determines the angle of the blades 26 of the second turbine $T_2$.

The cylinder 280–282 is completely closed by an annular cover 287, the support 270 is mounted on hollow radial arm 292, the inner ends of which are supported in hub 293 keyed to the shaft 36 which drives the front input ring gear 37. The radial arms lie directly in the path of oil flowing from the third turbine $T_3$ to the reaction member R. Consequently the shape of that portion of the arms which lies in the path is streamlined to reduce turbulence. Since $T_2$ always rotates faster than $T_3$ when the transmission is driving forward, the major axis of the spoke 292 is given a forward lead and is placed at an angle to be as nearly parallel as possible to the direction of oil flow from $T_3$ to R over the most important operating range. This is shown in FIG. 3. The hollow arm 292 forms a conduit for supplying oil under pressure to the pressure chamber 282.

As seen in FIG. 2A the second turbine shaft 36 may be formed integral with a drum 321 to which is attached the front input ring gear 37 and to which is splined a torque-establishing friction cone 322 which can move axially with respect to the drum 321. This torque-establishing device is for the purpose of holding the ring gear 37 in reverse drive as explained above and corresponds to the torque-establishing device 38 diagrammatically illustrated in FIG. 1. The exterior conical surface of the drum 322 cooperates with a conical surface of 324 formed on the inside of the stationary casing 213 and the internal conical surface of the drum 322 is engaged by an external conical surface on a piston 326 which may be urged to the right, as seen in FIG. 2A, by oil under pressure within a chamber 328.

The shaft 34 which connects the first turbine $T_1$ to the rear input sun gear is supported for rotation in a radial bearing 342 in a bore in the end of the transmission output shaft 56, which in turn in supported by the casing 213. The duct 236 in the shaft 34 has a connecting duct 346 which can transmit oil from the torque converter through the passage 234 (FIG. 2) in the collar 226 of the front cover 204 to various parts of the mechanism for lubrication, particularly radial bearing 342.

The hollow shaft 39 which is driven by the third turbine $T_3$, forms part of the direct drive mechanism from $T_3$ to the final drive shaft 16. This shaft 39 is connected to the rear carrier 42 in FIG. 1 and to the transmission output shaft 56. As seen in FIG. 2A this carrier and the connection to the output shaft are formed by a flange 350 which may be integral with the shaft 39, the planetary spindles 352 and the rear flange 354 which is splined to a flange 356 formed integral with the transmission output shaft 56. The front end of the shaft 56 is supported for rotation in the stationary casing 213 by a cylinder 358 fixed in the casing 213 and carrying at its inner part a radial bearing 360 which supports a clutch drum 362 carrying a radial bearing 364 which supports for rotation the front end of the transmission output shaft 56, which in turn supports the radial bearing 342 and the rear end of the shaft 34.

The carrier 40 of the front planetary unit in FIG. 1 is formed by a front flange 366 keyed to the shaft 39, the planetary spindles 368 and a rear flange 370.

The rear carrier spindles 352 have mounted thereon the planetary pinions 46 which mesh with the rear input sun gear 35 and with the rear reaction ring gear 58. The ring gear 58 is riveted to a flange 372 formed integral with the inner race 62 of the inner one-way brake or clutch which race is journaled on the third turbine shaft 39 by a radial bearing 376. The inner one-way device is completed by the one-way sprags or rollers 64 engaging the intermediate race 66, which in turn forms the inner race of the outer one-way device having the spindles or rollers 68 engaging the outer race 70, keyed to a drum 386 having a conical surface which can be pressed against an outer stationary conical surface 388 by a piston 390 operable in the cylinder 358 by fluid pressure admitted to the pressure chamber 391 within the cylinder 358 when desired. The arrangement is such that when the piston 390 sets the torque-establishing device 386 it positively holds the outer race 70 of the outer one-way device which prevents reverse rotation but allows forward rotation of the intermediate race 66, which in turn prevents reverse rotation but allows forward rotation of the rear reaction ring gear 58. The front reaction sun gear 60 is attached to the intermediate race 66. The front planetary unit is completed by the planetary pinions 44 mounted on the spindles 368. Thus the torque-establishing device 386–388 corresponds to the forward reaction torque-establishing device 72 in FIG. 1, and as in FIG. 1 when this torque-establishing device is set both the sun gear 60 and the ring gear 58 can rotate forward, but neither can rotate backward.

Also, as in FIG. 1 when the torque-establishing device 386–388 is released it permtis the ring 58 to drive the sun gear 60 backward when the transmission is set for reverse.

The neutral clutch construction is shown in FIG. 2A and corresponds to the diagrammatic neutral clutch 18 in FIG. 1. This clutch includes an inner clutch drum 392 keyed to the transmission output shaft 56 and having splined thereon driving plates 394 which are interleaved between driven plates 395 splined to the clutch drum 362 which latter is connected to a rear flange 396 which can form integral with, or secured to, the final drive shaft 16 shown in FIG. 1. The clutch may be engaged by a piston 398 operated by fluid pressure in a cylinder 400 supplied with oil through a duct 402 and may be released when there is no pressure in the cylinder 400 by a releasing spring 404.

The clutch drum 362 which is rigidly connected to the final drive shaft 16 may have any suitable parking brake represented by gear teeth 406 which may be engaged by any suitable locking device, not shown.

I claim:

1. A transmission comprising in combination a hydrodynamic torque transmitting device which includes an impeller and a plurality of turbines; first and second planetary gearsets each including an input gear, a reaction gear and planetary gears journaled on a carrier and meshing with the input and reaction gears; a first turbine of said device receiving liquid from the impeller and driving the input gear of one planetary gearset, a second turbine of said device receiving liquid from the first turbine and driving the input gear of the other planetary gearset, a third turbine of said device receiving liquid from the second turbine and connected in driving relationship to both carriers; a one-way torque-establishing device preventing reverse rotation of one reaction gear; a second one-way torque-establishing device between said reaction gears preventing reverse rotation of the other reaction gear, said second one-way torque-establishing device permitting forward rotation of said other reaction gear while said first one-way torque-establishing device prevents reverse rotation of said one reaction gear; and an output shaft driven by the carriers.

2. A transmission comprising in combination a hydrodynamic torque transmitting device which includes an impeller and a plurality of turbines; first and second planetary gearsets each including a ring gear, a sun gear and planetary gears journaled on a carrier; a first turbine of said device receiving liquid from the impeller and driving the sun gear of one planetary gear set forward; a second turbine of said device receiving liquid from the first turbine and driving the ring gear of the other planetary gear set forward; a third turbine of said device receiving liquid from the second turbine and connected in forward driving relationship to both carriers; a one-way torque-establishing device having one member thereof connected to the second sun gear, a second member thereof being adapted selectively to be held fixed or released for rotation, and one-way torque-transmitting means between said members; a second one-way torque-establishing device between the second sun gear and the first ring gear; means for holding the second-mentioned member of the first one-way torque-estatblishing device to rotate the carriers forward in response to forward rotation of the first turbine; and means for holding the second ring gear while releasing the second-mentioned member of the first one-way torque-establishing device to rotate the carriers backward in response to forward rotation of the first turbine.

3. A transmission comprising in combination a hydrodynamic torque converter which includes an impeller and a plurality of turbines; first and second planetary gearsets each including a ring gear, a sun gear and planetary gears journaled on a carrier, a first turbine of said device receiving liquid from the impeller and driving the ring gear of one planetary gearset forward, a second turbine of said device receiving liquid from the first turbine and driving the input gear of the other planetary gearset forward; a third turbine of said device receiving liquid from the second turbine and connected in driving relationship to both carriers; means for holding the second turbine stationary, the second turbine when stationary directing liquid to the third turbine so as to impress reverse torque on the third turbine; a one-way torque-establishing device having one member thereof connected to the second sun gear, a second member thereof being adapted selectively to be held fixed or released for rotation, and one-way torque-transmitting means between said members; a second one-way torque-establishing device between the second sun gear and the first ring gear adapted selectively to hold the first ring gear against reverse rotation or to rotate the second sun gear backward; means for holding the second-mentioned member of the first one-way torque-establishing device to rotate the carriers forward; and means for holding the second ring gear stationary while releasing the second-mentioned member of the first one-way torque-establishing device to rotate the carriers backward.

4. In a power transmission in combination, a hydrodynamic torque transmitting device having a radial outflow impeller for circulating working liquid successively through a series of axial flow turbines and a radial flow turbine; an output shaft; each turbine having the characteristic of providing a torque output which decreases as the speed of the turbine increases when no turbine preceding it in the series is providing torque, the first turbine to receive liquid from the impeller providing high torque output at stall, the succeeding turbines each providing torque which increases as the speed of such succeeding turbine approaches the speed of the impeller and its preceding turbine is providing torque; a first planetary gearset of relatively high mechanical advantage including a sun gear, a ring gear and planetary gears journaled on a carrier; a second planetary gearset of relatively low mechanical advantage including a sun gear, a ring gear and planetary gears journaled on a carrier; means connecting the carriers to the output shaft; the first axial flow turbine to receive liquid from the impeller being connected to the first sun gear; the second axial flow turbine being connected to the second ring gear; the radial flow turbine being connected to the carriers; and means for preventing reverse rotation while permitting forward rotation of the first ring gear and second sun gear.

5. A transmission comprising in combination a hydrodynamic torque converter having an impeller, turbines and a reaction member; a first planetary gearset including an input gear, a reaction gear and planetary gears mounted on a carrier connected to an output member; a second planetary gearset including an input gear, a reaction gear and planetary gears mounted on a carrier connected to the first carrier; one of the turbines being connected to rotate the first input gear forward at one range of torque multiplication relative to the impeller; another turbine being connected to rotate the second input gear forward at a different range of torque multiplication relative to the impeller; a one-way torque-establishing device for preventing reverse rotation of one of the reaction gears; and a second one-way torque-establishing device between reaction gears for preventing reverse rotation of the other reaction gear.

6. A transmission comprising in combination a first planetary gearset including a sun gear, a ring gear and planetary gears mounted on a carrier connected to an output member; a second planetary gearset including a ring gear, a sun gear and planetary gears mounted on a carrier connected to the first carrier; means for rotating the first sun gear forward at one range of speeds; means for simultaneously rotating the second ring gear forward at a different range of speeds; a one-way torque-establishing device for preventing reverse rotation of the second sun gear; and a second one-way torque-establishing device between the second sun gear and the first ring gear for preventing reverse rotation of the first ring gear.

7. A transmission comprising in combination a hydrodynamic torque converter having an impeller, turbines and a recation member; a first planetary gearset including an input gear, a reaction gear and planetary gears mounted on a carrier connected to a load shaft; a second planetary gearset including an input gear, a reaction gear and planetary gears mounted on a carrier connected to the first carrier; one of the turbines being connected to rotate the first input gear forward at one range of torque multiplication relative to the impeller; another turbine being connected to rotate the second input gear forward at another range of torque multiplication relative to the impeller; a one-way torque-establishing device connected to the the second reaction gear; a releasable torque-establishing device cooperating with the one-way device to prevent reverse rotation of the second reaction gear; and a second one-way torque-establishing device between the reaction gears for rotating the second reaction gear by reverse torque transmitted from the first reaction gear when said releasable torque-establishing device is released.

8. A transmission comprising in combination a first planetary gearset including an input gear, a reaction gear and planetary gears mounted on a carrier connected to a load shaft; a second planetary gearset including an input gear, a reaction gear and planetary gears mounted on a carrier connected to the first carrier; means for rotating the first input gear forward at one range of speeds; means for simultaneously rotating the second input gear forward at a different range of speeds; a one-way torque-establishing device connected to the second reaction gear; holding means adapted selectively to cooperate with the one-way torque-establishing device to prevent reverse rotation of the second reaction gear or to be released to permit reverse rotation of the second reaction gear; a second one-way torque-establishing device between the reaction gears for preventing reverse rotation of the first reaction gear when said holding means prevents reverse rotation of the second reaction gear and means for holding the second input gear while releasing said first-mentioned holding means whereby forward rotation of the first input gear rotates said load shaft in reverse.

9. A transmission comprising in combination a first planetary gearset including an input gear, a reaction gear and planetary gears mounted on a carrier connected to an output member; a second planetary gearset including an input gear, a reaction gear and planetary gears mounted on a carrier connected to the first carrier; means for rotating the first input gear forward at one range of speeds; means for simultaneously rotating the second input gear forward at a different range of speeds; means for preventing reverse rotation and permitting forward rotation of one of the reaction gears; and a one-way torque-establishing device between the reaction gears for preventing reverse rotation of the other reaction gear.

10. A transmission comprising in combination a first planetary gearset including a sun gear, a ring gear and planetary gears mounted on a carrier connected to an output member; a second planetary gearset including a ring gear, a sun gear and planetary gears mounted on a carrier connected to the first carrier; means for rotating the first sun gear forward at one range of speeds; means for simultaneously rotating the second ring gear forward at a different range of speeds; a ring member adapted to be held against rotation, a second ring member located concentrically within the first ring member and connected to the second sun gear, one-way torque-transmitting members between the ring members, a third ring member located concentrically within the second ring member and connected to the first ring gear, and one-way torque-transmitting members between the second and third ring members.

11. A transmission comprising in combination a first planetary gearset including a sun gear, a ring gear and planetary gears mounted on a carrier connected to an output member; a second planetary gearset including a ring gear, a sun gear and planetary gears mounted on a carrier connected to the first carrier; means for rotating the first sun gear forward at one range of speeds; means for simultaneously rotating the second ring gear forward at a different range of speeds; a ring member adapted selectively to be held against rotation or permitted to rotate, a second ring member located concentrically within the first ring member and connected to the second sun gear, one-way torque-transmitting members between the ring members, a third ring member located concentrically within the second ring member and connected to the first ring gear, and one-way torque-transmitting members between the second and third ring members.

12. A transmission comprising in combination a first planetary gearset including a sun gear, a ring gear and planetary gears mounted on a carrier connected to an output member; a second planetary gearset including a ring gear, a sun gear and planetary gears mounted on a carrier connected to the first carrier; means for rotating the first sun gear forward at one range of speeds; means for simultaneously rotating the second ring gear forward at a different range of speeds; a ring member adapted selectively to be held against rotation or permitted to rotate, a second ring member located concentrically within the first ring member and connected to the second sun gear, one-way torque-transmitting members between the ring members, a third ring member located concentrically within the second ring member and connected to the first ring gear, one-way torque-transmitting members between the second and third ring members, and means for selectively holding the second ring gear against rotation or permitting it to rotate.

13. A transmission comprising in combination a first planetary gearset including a sun gear, a ring gear and planetary gears mounted on a carrier connected to an output member; a second planetary gearset including a ring gear, a sun gear and planetary gears mounted on a carrier connected to the first carrier; means for rotating the first sun gear forward at one range of speeds; means for simultaneously rotating the second ring gear forward at a different range of speeds; a ring member adapted selectively to be held against rotation or released to rotate, a second ring member located concentrically within the first ring member and connected to the second sun gear, one-way torque-transmitting members between said ring members, a third ring member located concentrically within the second ring member and connected to the first ring gear, one-way torque-transmitting members between the second and third ring members, means adapted to be actuated selectively for holding the second ring gear against rotation or releasing it to rotate, means for holding the first ring member against rotation while the second ring gear is rotatable forwardly whereby the output shaft is rotated forward, and means for actuating the means for holding the second ring gear while releasing the first ring member whereby the output shaft is rotated backward.

14. A transmission comprising in combination a first planetary gear set including an input gear, a reaction gear and planetary gears mounted on a carrier and meshing with the input and reaction gears, the carrier being connected to an output member; a second planetary gearset including an input gear, a reaction gear and planetary gears meshing with the second input and reaction gears and mounted on a second carrier connected to the first carrier; a hydrodynamic impeller, a turbine driven hydrodynamically by the impeller and connected to drive the first input gear at one range of speeds, a second turbine driven by liquid from the first turbine and connected to drive the second input gear simultaneously at a different range of speeds, a one-way torque-establishing device for preventing reverse rotation of one of the reaction gears, means for selectively holding the second input gear or releasing it for rotation, and a second one-way torque-establishing device between the reaction gears for preventing reverse rotation of the other reaction gear when the second input gear is released and for driving the second reaction gear backward when the second input gear is held.

15. A transmission comprising in combination a first planetary gearset including an input gear, a reaction gear and planetary gears meshing with the input and reaction gears and mounted on a carrier connected to a load shaft; a second planetary gearset including an input gear, a reaction gear and planetary gears meshing with the second input and reaction gears and mounted on a second carrier connected to the first carrier; a hydrodynamic impeller, a turbine hydrodynamically driven by the impeller and connected to rotate the first input gear forward at one range of speeds, a second turbine driven by liquid from the first turbine and connected to rotate the second input gear forward simultaneously at different range of speeds, a one-way torque-establishing device connected to the second reaction gear, means for holding one member of the one-way torque-establishing device to prevent reverse rotation of the second reaction gear; a second holding means for selectively holding the second input gear or releasing it for rotation; a second one-way torque-establishing device between the reaction gears for preventing reverse rotation of the first reaction gear when the first holding means prevents reverse rotation of the second reaction gear and the second holding means is released, and for driving the second reaction gear backward when the second input gear is held, and a third turbine driven by liquid from the second turbine and connected to drive the carriers.

16. In an automatic power transmission mechanism capable of delivering power from a vehicle engine to a driven member, a hydrokinetic torque converter unit comprising primary and secondary turbine members and a pump member, said converter members defining in part a fluid torus circuit, said hydrokinetic torque converter unit further including a bladed reactor member interposed between the exit of said secondary turbine member and the entrance of said pump member, a plurality of radially extending shafts, each of the individual blades of said reactor member being mounted on one of said radially extending shafts, an annular piston slidably disposed in said reactor member, a connection between said annular piston and the radially inward ends of said shafts, said piston being adapted to adjust said shafts and said blades about substantially radial axes to alter the operating characteristics of said converter unit, a first planetary gear unit including a ring gear element, a carrier element and sun gear element, planet gears rotatably mounted on said carrier element in meshing engagement with said sun and ring gear elements, one of said turbine members being connected to said ring gear element; a second gear unit including a ring gear element, a sun gear element, a carrier element and planet gears mounted on said carrier element in meshing engagement with the associated ring and sun gear elements; said gear units defining in part a pair of torque delivery paths between said engine and said driven member, a first element of said second gear unit being connected to said driven member, a mechanical connection between the other of said turbine members and a second element of said second gear unit, the carrier element of said first gear unit being connected to an element of said second gear unit, a releasable forward drive brake mechanism, first overrunning coupling means for connecting the sun gear element of said first gear unit to said brake mechanism, second overrunning coupling means for connecting a third element of said second gear unit to said brake mechanism, and a releasable reverse drive brake means for anchoring an element of said first gear unit, one of said coupling means defining in part a torque transfer path between the third element of said second gear unit and the sun gear element of said first gear unit during reverse drive operation when said forward drive brake mechanism is released and said reverse drive brake means is applied.

17. In an automatic power transmission mechanism comprising a hydrokinetic torque converter and a pair of torque multiplying gear units, said torque converter including a pump, a primary turbine, a secondary turbine and a reactor, overrunning brake means for inhibiting rotation of said reactor in one direction, said pump, turbines and reactor being adapted to act in toroidal fluid flow relationship, each of said gear units including a sun gear member, a ring gear member and a planet gear carrier member, planet gears rotatably mounted on the carrier member of each gear unit in meshing engagement with the respective sun and ring gear members thereof, means for connecting the primary turbine to the ring gear member of a first unit of said pair of gear units, means for connecting the secondary turbine to the carrier member of said first gear unit and to a first member of a second unit of said pair of gear units, a mechanical brake mechanism, a first overrunning coupling means defining in part a connection between the sun gear member of said first gear unit and said mechanical brake mechanism whereby said sun gear member of said first gear unit is inhibited against rotation in one direction, a second overrunning coupling means defining in part a connection between a second member of said second gear unit and said brake mechanism whereby said second member of said second gear unit is inhibited against rotation in one direction, one member of said second unit being connected to driven portions of the transmission mechanism.

18. In an automatic power transmission mechanism comprising a hydrokinetic torque converter and a pair of torque multiplying gear units, said torque converter including a pump, a primary turbine, a secondary turbine and a reactor, overrunning brake means for inhibiting rotation of said reactor in one direction, said pump, turbines and reactor being adapted to act in toroidal fluid flow relationship, each of said gear units including a sun gear member, a ring gear member and a planet gear carrier member, planet gears rotatably mounted on the carrier member of each gear unit in meshing engagement with the respective sun and ring gear members thereof, means for connecting the primary turbine to the ring gear member of a first unit of said pair of gear units, means for connecting the secondary turbine to the carrier member of said first gear unit and to a first member of a second unit of said pair of gear units, a mechanical brake mechanism, a first overrunning coupling means defining in part a connection between the sun gear member of said first gear unit and said mechanical brake mechanism whereby said sun gear member of said first gear unit is inhibited against rotation in one direction, a second overrunning coupling means defining in part a connection between a second member of said second gear unit and said brake mechanism whereby said second member of said second gear unit is inhibited against rotation in one direction, one member of said second unit being connected to driven portions of the transmission mechanism, the connection between the sun gear member of said first gear unit and said brake mechanism and the connection between said second member of said second gear unit and said brake mechanism each having a common portion, one of said coupling means and said common connection portion defining in part a mechanical torque transfer path between said second member of said second gear unit and the sun gear member of said first gear unit when said mechanical brake mechanism is deenergized, and auxiliary brake means for selectively anchoring one member of said first gear unit whereby a reverse torque is imparted to said power output member when said mechanical brake mechanism is deenergized.

19. An automatic power transmission mechanism comprising a hydrokinetic torque converter and a pair of torque multiplying planetary gear units, said torque converter including a pump, a primary turbine, a secondary turbine and a reactor, overrunning brake means for inhibiting rotation of said reactor in one direction, said pump, turbines and reactor being adapted to act in toroidal fluid flow relationship, each of said gear units including a sun gear member, a ring gear member and a planet gear carrier member, planet gears rotatably mounted on the carrier member of each gear unit in meshing engagement with the respective sun and ring gear members thereof, means for connecting the primary turbine to the ring gear member of a first unit of said pair of gear units, means for connecting the secondary turbine to the carrier member of said first gear unit and to a first member of a second unit of said pair of gear units, means for braking a second member of said second gear unit, one member of said second gear unit being connected to a driven portion of the transmission mechanism, said last named braking means including a selectively operable friction brake mechanism and a first overrunning coupling means for connecting said second member of said second gear unit to said brake mechanism thereby inhibiting rotation of said second member of said second gear unit in one direction, a second overrunning coupling means for connecting the sun gear member of said first gear unit to said brake mechanism thereby inhibiting rotation of said sun gear member of said first gear unit in one direction, and additional brake means for anchoring one member of said first gear unit to effect reverse operation, one of said overrunning coupling means defining in part a mechanical torque transfer path between said sun gear member of said first gear unit and said second member of said second gear unit when said selectively operable brake mechanism is deenergized and said transmission mechanism is conditioned for reverse operation.

20. In an automatic power transmission mechanism capable of delivering power from a vehicle engine to a driven member, a hydrokinetic torque converter unit comprising primary and secondary turbine members and a pump member, said converter members defining in part a fluid torus circuit, said hydrokinetic torque converter unit further including a bladed reactor member interposed between the exit of said secondary turbine member and the entrance of said pump member, a plurality of radially extending shafts, each of the individual blades of said reactor member being mounted on one of said radially extending shafts, an annular piston slidably disposed in said reactor member, a connection between said piston and the radially inward ends of the shafts, said piston being adapted to adjust said shafts and said blades about substantially radial axes to alter the operating characteristics of said converter unit, a planetary gear mechanism forming a pair of power delivery paths extending from said engine to said driven member and including a first gear unit comprising a ring gear element, a carrier element and a sun gear element, planet gears rotatably mounted on said carrier element in meshing engagement with said sun and ring gear elements, means for connecting one of said turbine members to said ring gear element; a second gear unit comprising a sun gear element, a ring gear element, a carrier element and planet gears mounted on said carrier element in meshing engagement with the associated sun and ring gear elements; a brake member, first overrunning coupling means for connecting the sun gear element of said first gear unit to said brake member, second overrunning coupling means for connecting a first element of said second gear unit to said brake member, means for connecting the other turbine member to a second element of said second gear unit, and means for transmitting power from each carrier element to said driven member.

21. In a power transmission mechanism for transferring power from an engine to a driven member, a hydrokinetic unit comprising a fluid pump, a pair of turbine members cooperating with said pump to define a fluid torus circuit, a first and a second planetary gear unit, each gear unit including a sun gear element, a ring gear element and a planet gear carrier element, planet gears rotatably mounted on the carrier element of each gear unit in meshing engagement with the respective sun and ring gear elements thereof, one element of said second gear unit being connected to said driven member, and a pair of power delivery paths between said hydrokinetic unit and said driven member, one path being comprised of a direct, continuously effective mechanical connection between one of said turbine members and another element of said second gear unit and the other path being defined in part by said first gear unit, a direct, continuously effective mechanical connection between one element of the latter and the other turbine member, another element of said first gear unit being coupled to an element of said second gear unit, means for braking a third element of said first and second gear units to absorb the driving torque reaction, said braking means comprising a one-way brake disposed adjacent a relatively stationary portion of said mechanism and a torque transfer means for transmitting the driving torque reaction of said first gear unit from the third element thereof to said one-way brake, said braking means further including a second one-way brake situated adjacent said relatively stationary portion and adapted to absorb the driving torque reaction exerted on the third element of said second gear unit.

22. In a power transmission mechanism for transferring power from an engine to a driven member, a hydrokinetic unit comprising a fluid pump, a pair of turbine members cooperating with said pump to define a fluid torus circuit, a first and a second planetary gear unit, each gear unit including a sun gear element, a ring gear element and a planet gear carrier element, planet gears rotatably mounted on the carrier element of each gear unit in meshing engagement with the respective sun and ring gear elements thereof, one element of said second gear unit being connected to said driven member, and a pair of power delivery paths between said hydrokinetic unit and said driven member, one path being comprised of a direct, continuously effective connection between one of said turbine members and another element of said second gear unit and the other path being defined in part by said first gear unit, a direct, continuously effective mechanical connection between one element of the latter and the other turbine member, another element of said first gear unit being coupled to an element of said second gear unit and means for braking a third element of said first and second gear units to absorb the driving torque reaction, said braking means comprising a one-way brake disposed adjacent a relatively stationary portion of said mechanism and a torque transfer means for transmitting the driving torque reaction of said first gear unit from the third element thereof to said one-way brake.

23. In a power transmission mechanism for transferring power from an engine to a driven member, a hydrokinetic unit comprising a fluid pump, a pair of turbine members cooperating with said pump to define a fluid torus circuit, a first and a second planetary gear unit, each gear unit including a sun gear element, a ring gear element and a planet gear carrier element, planet gears rotatably mounted on the carrier element of each gear unit in meshing engagement with the respective sun and ring gear elements thereof, one element of said second gear unit being connected to said driven member, and a pair of power delivery paths between said hydrokinetic unit and said driven member, one path being comprised of a direct, continuously effective mechanical connection between one of said turbine members and another element of said second gear unit and the other path being defined in part by said first gear unit, a direct, continuously effective mechanical connection between one element of the latter and the other turbine member, another element of said first gear unit being coupled to an element of said second gear unit, and means for braking a third element of said first and second gear units against a relatively stationary portion of said mechanism to absorb the driving torque reaction, said braking means comprising a one-way brake disposed adjacent said relatively stationary portion of said mechanism and a torque transfer means for transmitting the driving torque reaction of said first gear unit from the third element thereof to said one-way brake, said relatively stationary portion comprising a brake member and a friction brake element encircling said brake member, said friction brake element being adapted to frictionally anchor said brake member to maintain the same in a relatively stationary position during operation of the transmission mechanism.

24. In a power transmission mechanism for transferring power from an engine to a driven member, a hydrokinetic unit comprising a fluid pump, a pair of turbine members cooperating with said pump to define a fluid torus circuit, a first and a second planetary gear unit, each gear unit including a sun gear element, a ring gear element and a planet gear carrier element, planet gears rotatably mounted on the carrier element of each gear unit in meshing engagement with the respective sun and ring gear elements thereof, one element of said second gear unit being connected to said driven member, and a pair of power delivery paths between said hydrokinetic unit and said driven member, one path being comprised of a direct, continuously effective mechanical connection between one of said turbine members and another element of said second gear unit and the other path being defined in part by said first gear unit, a direct, continuously effective mechanical connection between one element of the latter and the other turbine member, another element of said first gear unit being coupled to an element of said second gear unit and means for braking a third element of said first and second gear units against a relatively stationary portion of said mechanism to absorb the driving torque reaction, said braking means comprising first and second one-way brakes respectively defining in part torque transfer means for transmitting the driving torque reaction of said first and second gear units from the respective third elements thereof to said stationary portion.

References Cited by the Examiner
UNITED STATES PATENTS

| | | | |
|---|---|---|---|
| 2,055,895 | 9/1936 | Fawcett | 74—718 |
| 2,316,390 | 4/1943 | Biermann | 74—677 |
| 2,645,137 | 7/1953 | Roche | 74—754 X |
| 2,749,777 | 6/1956 | Simpson | 74—761 |
| 2,795,154 | 6/1957 | Russell | 74—677 |
| 2,855,803 | 10/1958 | Knowles | 74—677 |
| 2,903,912 | 9/1959 | Edsall et al. | 74—677 |

DON A. WAITE, *Primary Examiner.*

BROUGHTON G. DURHAM, *Examiner.*